(12) United States Patent
Weber

(10) Patent No.: US 6,827,102 B2
(45) Date of Patent: Dec. 7, 2004

(54) THREE PORT-TWO WAY SOLENOID VALVE

(75) Inventor: Alexis C. Weber, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/423,310

(22) Filed: Apr. 25, 2003

(65) Prior Publication Data

US 2004/0211472 A1 Oct. 28, 2004

(51) Int. Cl.[7] ............................................. F15B 13/044
(52) U.S. Cl. ............................. 137/596.17; 251/129.14
(58) Field of Search .................. 137/596.17; 251/129.14

(56) References Cited

U.S. PATENT DOCUMENTS

| | | | | |
|---|---|---|---|---|
| 4,949,752 A | * | 8/1990 | Nogle et al. | 137/596.17 |
| 4,998,559 A | * | 3/1991 | McAuliffe, Jr. | 137/596.17 |
| 5,606,992 A | * | 3/1997 | Erickson et al. | 137/596.17 |
| 5,651,391 A | * | 7/1997 | Connolly et al. | 137/596.17 |
| 5,915,416 A | * | 6/1999 | Okazaki et al. | 137/596.17 |
| 6,578,933 B2 | | 6/2003 | Hageman et al. | |

* cited by examiner

Primary Examiner—Gerald A. Michalsky
(74) Attorney, Agent, or Firm—Jimmy L. Funke

(57) ABSTRACT

A valve assembly for use with a solenoid having a plunger being actuatable from a first position to a second position, comprising: a housing, comprising a first port, a second port and a third port and a central opening being defined by a plurality of first channels, a plurality of second channels and a reduced opening disposed between the plurality of first channels and the plurality of second channels; a movable element disposed within the central opening, the movable element being moved when the plunger moves from the first position to the second position; wherein the first port is in fluid communication with the second port via the plurality of first channels when the plunger is in the first position; and wherein the first port is in fluid communication with the third port via the plurality of second channels, the reduced opening and the plurality of first channels when the plunger is in the second position.

27 Claims, 5 Drawing Sheets

THREE PORT-TWO WAY SOLENOID VALVE

TECHNICAL FIELD

The present invention relates to control valves and more particularly, to an apparatus and method for providing a three port-two way normally closed solenoid valve.

BACKGROUND

A solenoid valve assembly typically comprises at least the following elements: a cylindrical coil, a ferromagnetic frame or structure, a ferromagnetic plunger and if necessary a stationary magnetic pole or travel stop. As is known in the related arts a magnetic field is generated in the solenoid by passing an electrical current through the coil. The frame or structure surrounding the coil, the plunger and the stationary magnetic pole provide a flux path or focus the magnetic field. The plunger reacts to the magnetic field and is attracted to the stationary pole, wherein the movement of the plunger is used to cause a desired effect, for example the opening and closing of a valve by manipulating a member or device for the desired effect.

Solenoid valves or solenoid control valves are used in many applications and as these applications vary so do the constraints associated therewith. When selecting or designing a solenoid actuated valve assembly many factors are considered such as, size constraint, durability, expected life and as well as others. As the required operation of the valve assembly becomes more complex, the number of moving parts requiring specific tolerances and alignment also increases.

SUMMARY

A three port-two way solenoid valve assembly wherein the configuration of the valve actuating assembly is configured to provide a durable device with larger tolerance as compared to other three port-two way valve assemblies.

A valve assembly for use with a solenoid having a plunger being actuatable from a first position to a second position, comprising: a housing, comprising a first port, a second port and a third port and a central opening being defined by a plurality of first channels, a plurality of second channels and a reduced opening disposed between the plurality of first channels and the plurality of second channels; a movable element disposed within the central opening, the movable element being moved when the plunger moves from the first position to the second position; wherein the first port is in fluid communication with the second port via the plurality of first channels when the plunger is in the first position; and wherein the first port is in fluid communication with the third port via the plurality of second channels, the reduced opening and the plurality of first channels when the plunger is in the second position.

A three port-two way valve assembly, comprising: a solenoid for actuating a plunger between a first position and a second position wherein movement of the plunger from the first position to the second position manipulates an element of the valve assembly wherein movement of the element closes a first fluid path and opens a second fluid path, the first fluid path being defined by; a first port in the valve assembly, a plurality of first openings in fluid communication with the first port, the plurality of first openings defining a race for a portion of the element to move within, and a second port in fluid communication with the plurality of first openings when the plunger is in the first position; and the second fluid path being defined by; a third port in the valve assembly, a plurality of second openings in fluid communication with the third port, the plurality of second openings defining a race for a sealing member movably disposed in the race, and an opening in fluid communication with the plurality of first openings and the plurality of second openings when the plunger is in the second position.

A method for actuating a three port-two way valve assembly having a plunger being actuatable from a first position to a second position by a solenoid, comprising: moving the plunger from a first position to a second position wherein movement of the plunger from the first position to the second position manipulates an element of the valve assembly along the same axis as the plunger and the element closes a first fluid path defined by; a first port in the valve assembly, a plurality of first openings in fluid communication with the first port, the plurality of first openings defining a race for a portion of the element to move within and a second port in fluid communication with the plurality of first openings, and the element opens a second fluid path defined by; a third port is the valve assembly, a plurality of second openings in fluid communication with the third port, the plurality of second openings defining a race for a sealing member movably disposed in the race, and an opening in fluid communication with the plurality of first openings and the plurality of second openings; wherein the element comprises a head portion, a main body portion and an actuating tip, wherein the head portion seals the plurality of first openings from the second port when the plunger is in the second position and the actuating tip enables fluid communication between the plurality of first openings and the plurality of second openings by moving the sealing member of the opening away from a sealing position, the sealing member being biased into the sealing position.

The above-described and other features and advantages of the present invention will be appreciated and understood by those skilled in the art from the following detailed description, drawings, and appended claims.

DETAILED DESCRIPTION OF THE EMBODIMENTS

Figure 1:
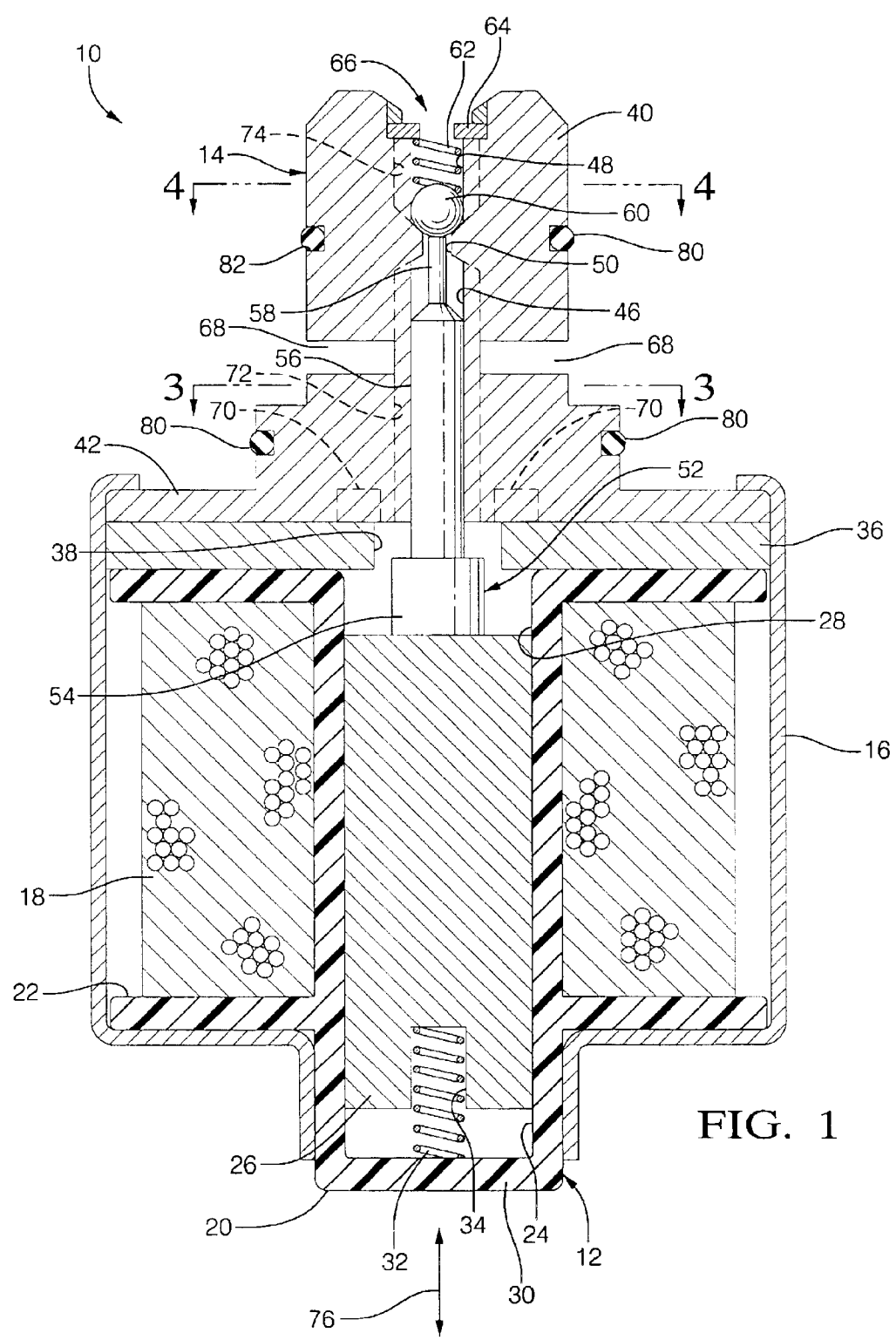
FIG. 1 is a cross-sectional view of a normally closed three port-two way solenoid actuated valve of the present disclosure in a first normally closed position.
Figure 2:
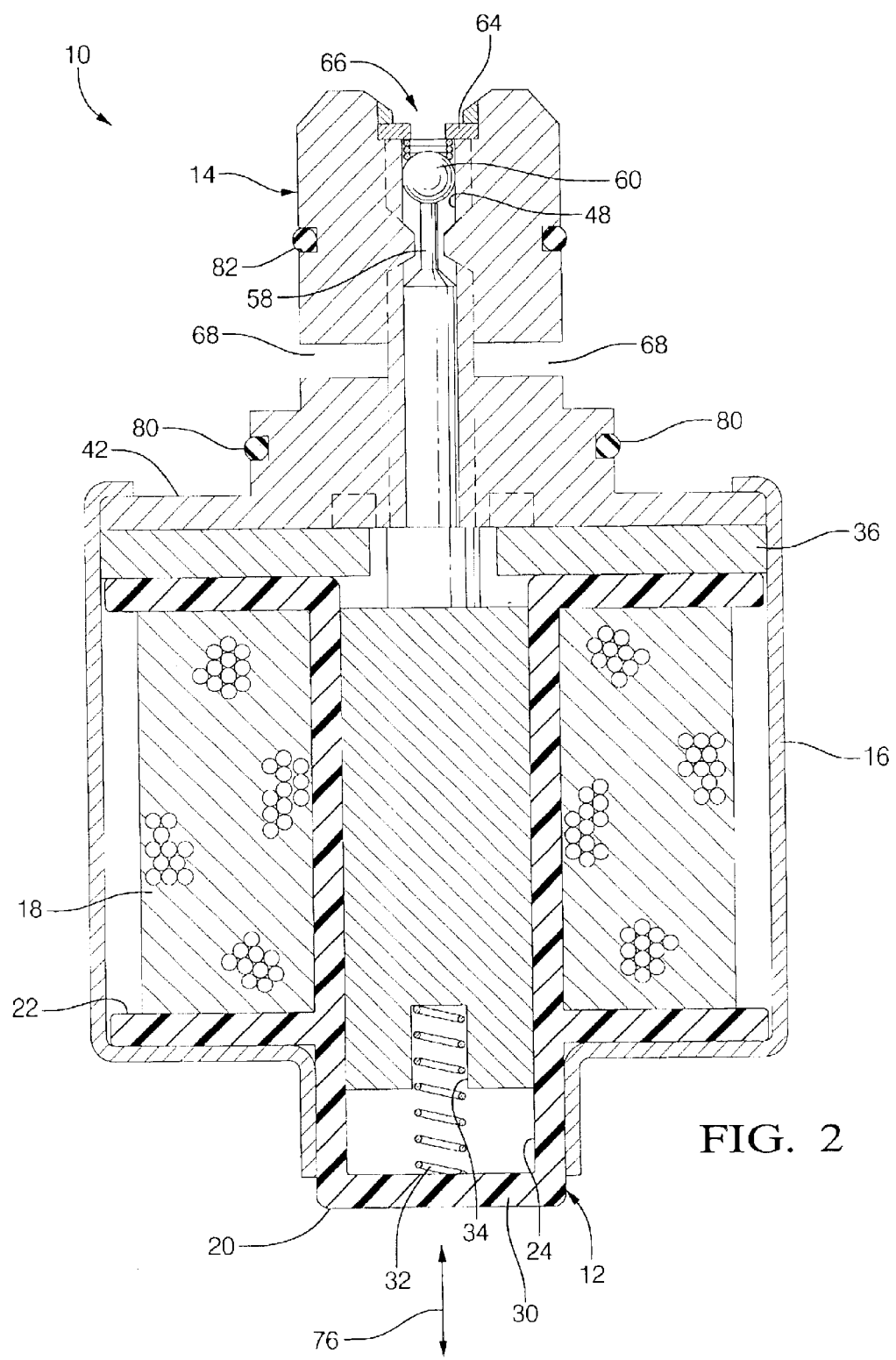
FIG. 2 is a cross-sectional view of a normally closed three port-two way solenoid actuated valve of the present disclosure in a second open position.

Referring now to FIGS. 1 and 2, a three port-two way normally closed solenoid valve assembly 10 is illustrated. Although the present disclosure will describe the valve assembly as being normally closed it is of course, contemplated that the valve assembly of the present disclosure may be configured to be normally open.

An example of an intended use of the present disclosure is in the hydraulic control system of hydraulic transmissions for a vehicle wherein a controller provides a signal to the valve assembly to actuate the plunger in order to facilitate the shifting of the transmission. Of course, the present disclosure is not intended to be limited to this particular use, as the applications of the valve assembly of the present disclosure are numerous.

The valve assembly 10 comprises a magnetic package or assembly 12 and a hydraulic or valve assembly 14 each of which are disposed at least partially within a frame 16 of the valve assembly 10. Magnetic assembly 12 further comprises at least one coil 18 wound about a spool or bobbin 20. Bobbin 20 is formed out of a non-ferromagnetic material such as plastic or non-ferromagnetic metals and is configured to have an area 22 for receiving the coil: In addition, the bobbin also defines a central opening 24 configured for slidably receiving a plunger element 26 therein. Thus, plunger 26 is slidably received within a central opening that preferably comprises a low friction material such as plastic or non-ferromagnetic metals.

In accordance with an exemplary embodiment central opening 24 is open at a first end 28 and is closed at a second end 30. Disposed between second end 30 and one end of plunger 26 is a first spring 32, which in the assembled state of the valve assembly makes contact with second end 30 and a receiving area 34 disposed within one end of plunger 26. As an alternative, plunger 26 is configured to have a flat surface with no receiving area 34.

Magnetic package 12 also comprises a stationary magnetic pole or primary plate 36. Primary plate 36 is disposed between the bobbin and valve assembly 14 when valve assembly 10 is completely assembled. Primary plate 36 is also configured to have a central opening 38. In an exemplary embodiment, frame 16, plunger 26 and primary plate or stationary magnetic pole 36 are constructed out of ferromagnetic materials, or equivalents thereof, which will cause plunger 26 to be actuated to the position illustrated in FIG. 2 when the coils are energized.

Valve assembly 14 comprises a housing 40 having a flange portion 42 which is received within frame 16 and is positioned adjacent to primary plate 36 in the completed valve assembly. Housing 40 also comprises a central through opening 44 having a poppet rod opening 46 in fluid communication with a supply port opening 48 via a reduced opening 50 disposed therebetween.

A poppet rod element or movable element 52 is configured to be slidably received within central through opening 44. Poppet rod element 52 is configured to be moved, actuated or slid from the position illustrated in FIG. 1 to the position illustrated in FIG. 2 by plunger 26. Poppet rod element 52 further comprises a head portion 54, a body portion 56 and an actuating tip 58. In an exemplary embodiment, poppet rod 52 is formed out of stainless steel. Of course, other equivalent materials or materials of equivalent characteristics are contemplated for poppet rod 52, such as non-ferromagnetic materials. Also, poppet rod element 52 comprises a reduced or conically shaped area between actuating tip 58 and body portion 56, which has a similar configuration to the walls comprising reduced opening 50 at the poppet rod element and reduced opening interface. Of course, other configurations for the area between the actuating tip 58 and body portion 56 are contemplated to be within the scope of the present disclosure. This configuration and the length of actuating tip 58 provides a portion of the fluid path illustrated in FIGS. 2 and 6.

A means for sealing supply port opening 48 from reduced opening 50 is disposed within supply port opening 48. In an exemplary embodiment the means for sealing supply port opening 48 comprises a ball or sphere 60, a biasing spring 62 and a spring retainer 64. Ball or sphere 60 is configured to be moved, actuated, rolled or slid from the position illustrated in FIG. 1 to the position illustrated in FIG. 2. In an exemplary embodiment, ball 60 is inserted first, then spring 62 and then spring retainer 64, which may be press fitted therein to retain ball 60 and spring 62 into supply port 66.

In an alternative embodiment, wherein the valve assembly is used in environments having large supply pressures or designs allowing for large leakage tolerances at the supply port (e.g., low pressure environments) biasing spring 62 and/or spring 32 can be eliminated.

Housing 40 also has a supply port 66, a pair of control ports 68 and a pair of exhaust ports 70 (illustrated in phantom) as they are normal to the plane illustrated by FIGS. 1 and 2. It is, of course, contemplated that in accordance with alternative exemplary embodiments housing 40 may have at least one supply port and/or at least one control port or alternatively more than two supply ports and/or more than two control ports.

In accordance with an exemplary embodiment of the present disclosure, and in the normally closed position, control ports 68 are in fluid communication with exhaust ports 70, wherein the movement of the poppet rod element from the position in FIG. 1 to the position in FIG. 2 causes the exhaust ports 70 to be sealed and control ports 68 are now in fluid communication with supply port 66.

Figure 3:
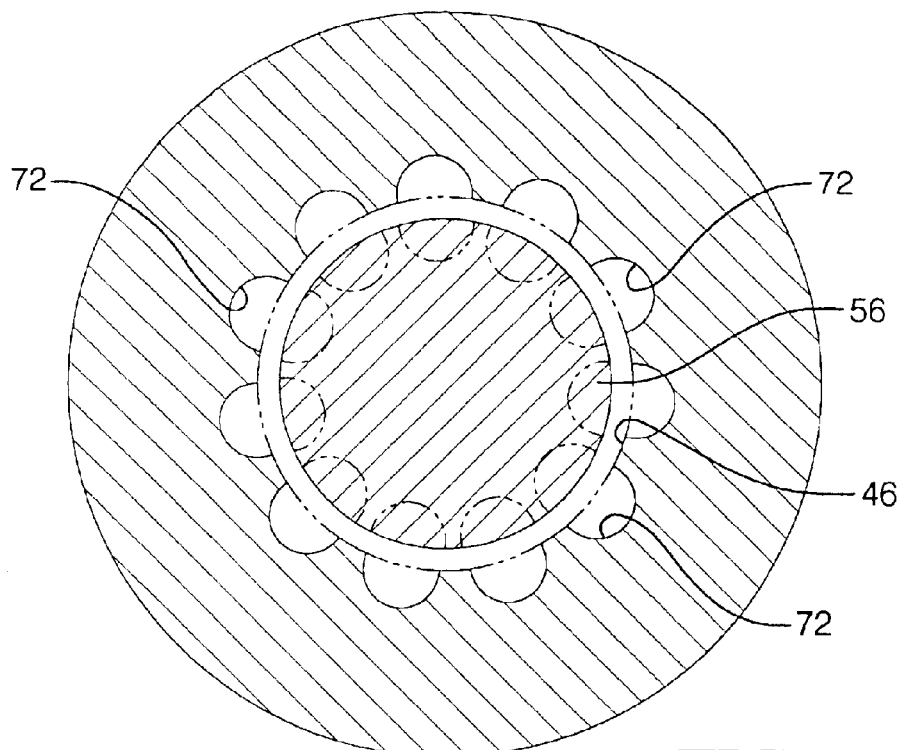
FIG. 3 is a view along lines 3—3 of FIG. 1.
Figure 5:
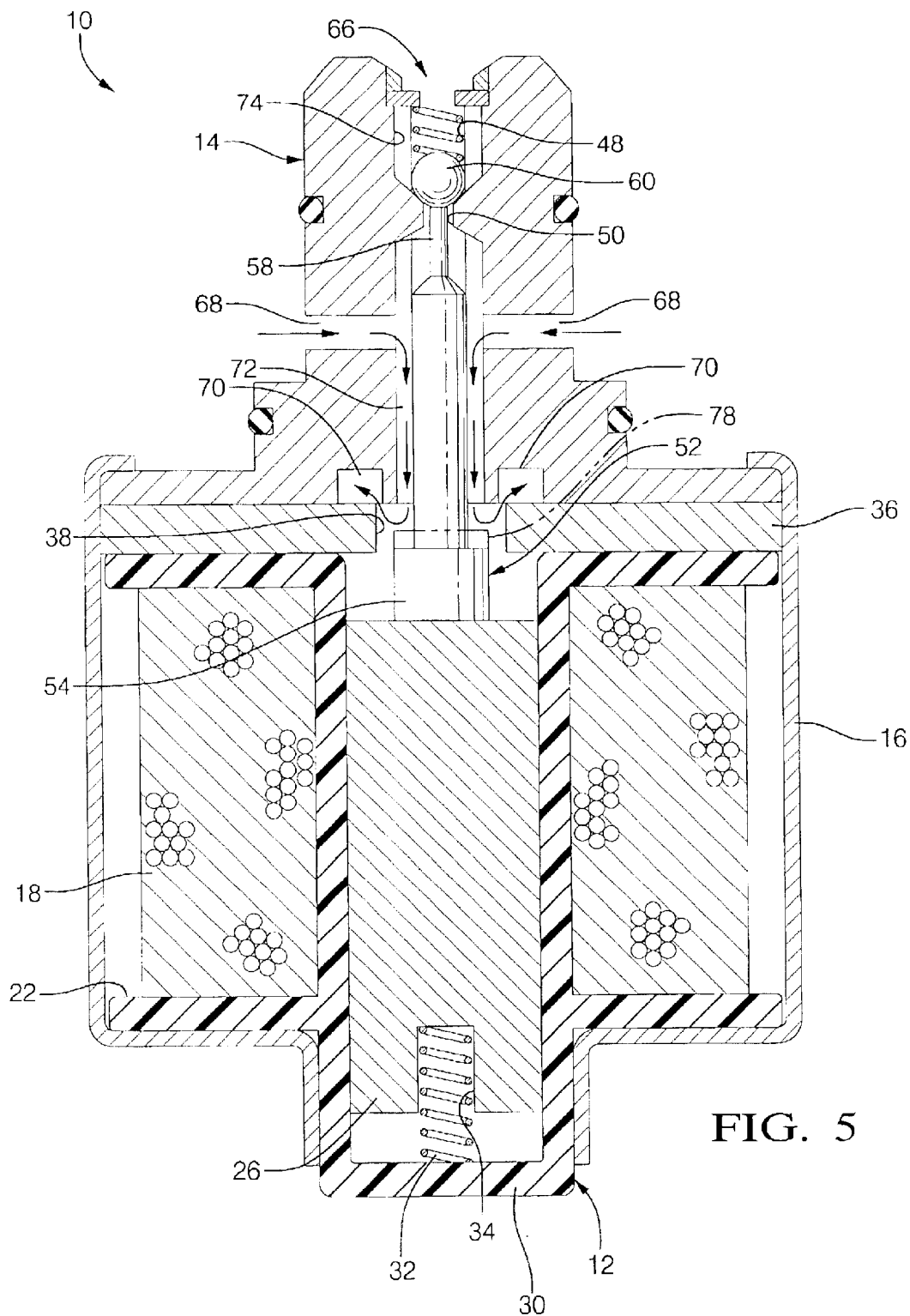
FIG. 5 is a cross-sectional view of a normally closed three port-two way solenoid actuated valve of the present disclosure in a first normally closed position.

Referring now to FIGS. 1 and 3 poppet rod opening 46 is configured to have a plurality of fluted openings 72 disposed about the periphery of poppet rod opening 46. Openings 72 provide a means for fluid communication between exhaust ports 70 and control ports 68 when the poppet rod element is in the position illustrated by FIG. 1. Openings or channels 72 may have any configuration sufficient to enable fluid transfer between ports 68 and ports 70. The path of fluid communication is illustrated by the arrows in FIG. 5, wherein the numerous reference numerals of FIG. 1 are removed for clarity. Thus, and as illustrated in FIG. 5 fluid may travel into control ports 68, then through fluted openings 72 into the area defined between head portion 54 and flange portion 42 of housing 40 and then ultimately into exhaust ports 70, when the assembly is in the position illustrated in FIGS. 1 and 5. Of course, depending on the application and the pressure differential between port 70 and ports 68 the flow of the fluid may be opposite to the directions shown in FIG. 5.

Referring back now to FIG. 3, opening 46 and fluted openings 72 define an inner race for allowing body portion 56 of poppet rod 52 to be slidably received therein while also maintaining the fluid path illustrated in FIG. 5. This inner race allows the poppet rod to be slid therein while also allowing fluid communication around body portion 56. Of course, body portion 56 is slightly smaller than the inner race.

As an alternative, and as illustrated by the dashed lines in FIG. 3, opening 46 does not have any fluted openings and body portion 56 of poppet rod element is configured to have fluted openings or channels disposed on an exterior surface thereof to allow for the fluid to pass therethrough. In yet another alternative both the body portion 56 and opening 46 are configured to have openings. Of course, in this embodiment the openings should have different configurations or sizes to allow for fluid transfer as well as movement of the poppet rod element within the opening.

Figure 4:
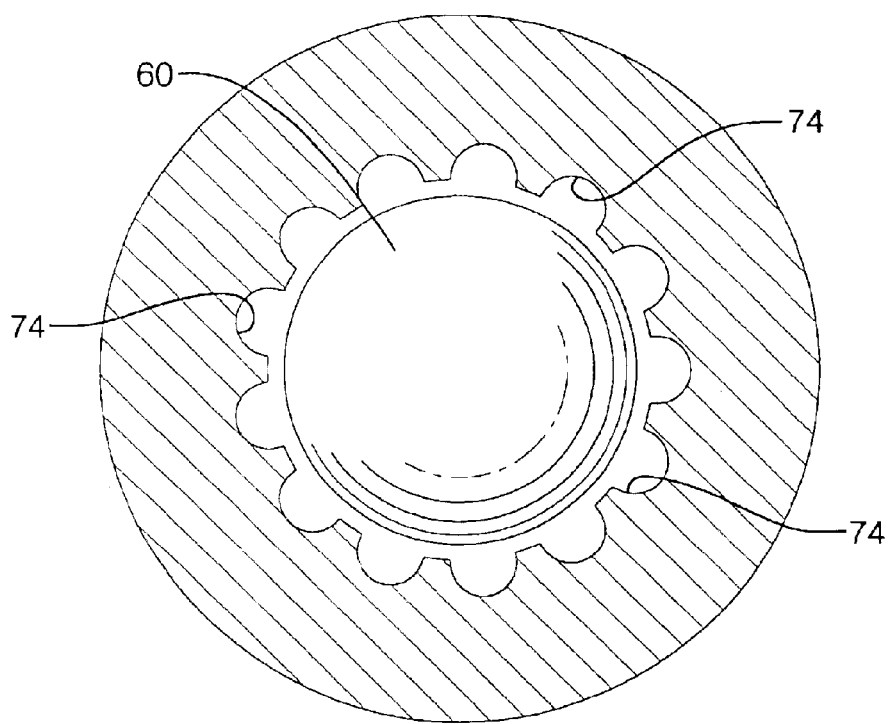
FIG. 4 is a view along lines 4—4 of FIG. 1.

Referring now to FIGS. 1 and 4, supply port opening 48 is also configured to have a plurality of fluted openings 74 disposed about the periphery of supply port opening 48. Openings 74 provide a means for fluid communication between supply port opening 48 and control ports 68 through reduced opening 50 when the poppet rod element is in the position illustrated by FIG. 2. Openings or channels 74 may have any configuration sufficient to enable fluid transfer between port 66 and port 68. The path of fluid communication is illustrated by the arrows in FIG. 6 wherein the numerous reference numerals of FIG. 2 are removed for clarity.

Figure 6:
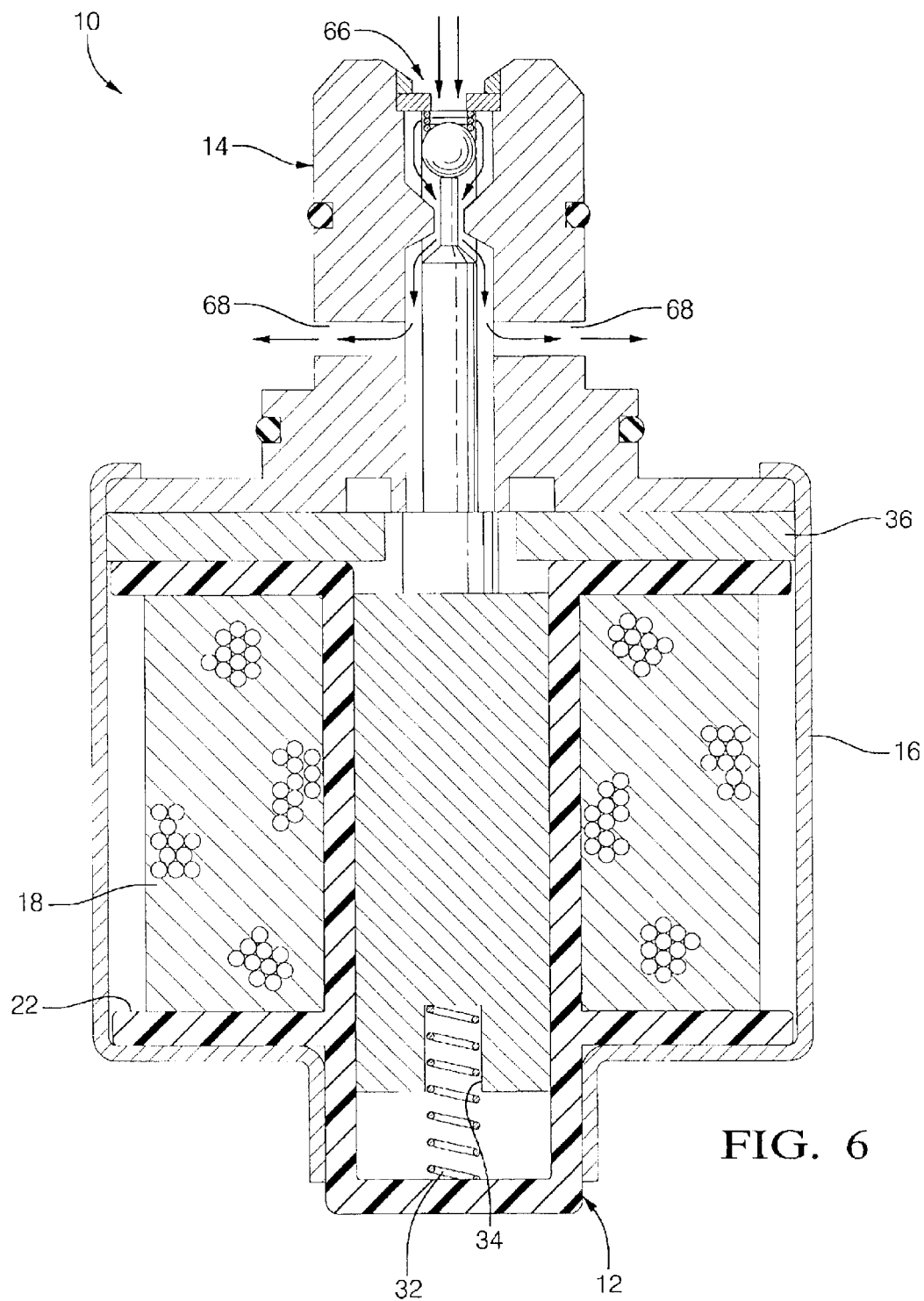
FIG. 6 is a cross-sectional view of a normally closed three port-two way solenoid actuated valve of the present disclosure in a second open position.

Thus, and as illustrated in FIG. 6 fluid may travel into the supply port opening 48, through fluted openings 74 and into control ports 68, when the assembly is in the position illustrated in FIGS. 2 and 6. Of course, depending on the application and the pressure differential between supply port 66 and ports 68 the flow of the fluid may be opposite to the directions shown in FIG. 6. It is also noted that the spring retainer is also configured to allow fluid therethrough by for example, openings disposed therein or alternatively being press fitted into the inner race defined by openings 74 wherein openings 74 are disposed about the periphery of spring retainer 64. In an alternative embodiment, spring retainer is a filter, which may comprise a mesh material adapted to filter the fluid passing through the supply port.

In any of the aforementioned embodiments, the spring retainer or filter is secured by any know securement means including but not limited to the following: press fitting, interference fit, welding (ultrasonically or otherwise) and chemical (e.g., adhesive).

Referring back now to FIGS. 1 and 2, the valve assembly of the present disclosure is illustrated in its normally closed position wherein the ball positioned within supply port opening is biased into the illustrated position by either spring 62 or a hydrostatic or hydrodynamic pressure from the fluids in communication with port 66 or alternatively both, which will keep the ball in the position illustrated, wherein opening 50 is sealed by ball 60. As illustrated, the surface area surrounding opening 50 on the supply port side is chamfered or angled to facilitate the closing or sealing of reduced opening 50 by ball 60. Also noted is that openings 74 terminate before opening 50 so that ball 60 provides an effective means for sealing of the same.

Referring now to FIG. 2, as the coil is energized the plunger is attracted by the primary plate and makes contact with head portion 54 thereby sliding poppet rod element 52 to the position illustrated in FIG. 2. As this occurs actuating tip 58 makes contact with ball 60 and passes through reduced opening 50 in order to move ball 60 to the position illustrated in FIG. 2. As illustrated, actuating tip 58 is smaller than opening 50 and is of a sufficient length to move ball 60 to a position wherein fluid from supply port 66 may travel through openings 74, through opening 50 into opening 72 and ultimately to ports 68.

It is also noted that in this position exhaust ports 70 are effectively sealed off by head portion 54 of poppet rod element 52. This is due to the configuration of head portion 54, which has an outer diameter large enough to cover openings 72 by engaging a surface of head portion 54 with the surface of flange portion 42 comprising openings 72. In order to facilitate this closing operation, opening 38 is of a sufficient size to allow head portion 54 to be inserted therein. In addition, head portion 54 is also configured to be inserted therein by plunger 26.

Accordingly, the poppet rod element provides the dual function of opening or fluidly connecting supply port 66 with control ports 68 while sealing exhaust ports 70 from opening 72. Thus, a single element (e.g., poppet rod element) provides a means for opening and closing two ports of a three port configuration having two discrete fluid paths. Therefore, movement of the poppet rod element performs the task of closing or opening of the ports and redirecting the flow path of the valve assembly. Accordingly, only two components need to be aligned with each other in order to actuate the three port-two way valve assembly of the present disclosure namely, the poppet rod element and the plunger, which acts upon the head portion of the poppet rod element. This is significantly less than the number of components requiring alignment with each other in order to provide a three port-two way valve assembly.

Also noted is that the path of movement of the poppet rod element required for such an operation is, in accordance with the present disclosure, along the same path, axis or line of movement of the plunger element which will provide the least amount of side loads on the plunger or in other words the load (e.g., movement of the poppet rod element) is in line with the path of travel of the plunger, which is illustrated in the Figures as well as arrows 76.

In addition, and in accordance with an exemplary embodiment of the present disclosure plunger 26 and head portion 54 are arranged to merely make contact with each other (e.g., there is no press fit or securement of the poppet rod to the plunger). Moreover, and since the plunger and the head portion are the only two portions that make contact with each other in order to actuate the poppet rod and thus the valve assembly, there can be a larger tolerance for misalignment both perpendicularly and concentrically between the plunger and the poppet rod element, as this is the only interface between the plunger and the poppet rod element and the interface is not a fixed point of securement between the two. Therefore, the present disclosure provides a valve assembly having a configuration that provides a reduced tolerance stack.

Additionally and since there is no press fit between the poppet rod element and the plunger, there is no stress applied to the poppet rod element for securing the two items to each other. Also, and since there is no fixed point of attachment between the two elements, there is no need for pre-calibration of the assembly as in accordance with the present disclosure, the only requirement of the assembly of the present disclosure is that the plunger be actuatable to move the poppet rod the pre-determined distance required to make the head portion contact the flange portion and effectively seal off exhaust ports 70 by blocking openings 72.

In addition, and due to this configuration, the major forces applied or stress induced upon poppet rod element 52 are at the surface of head portion making contact with the surface of the flange portion to close openings 72, which effectively is a surface mating with another surface wherein the mating surfaces are larger in area than the contact point or contact line between the ball and the actuating tip of the poppet rod element. In an alternative embodiment, the flat surface of head portion 54 is equipped with a washer or grommet 78, which provides a means for seating openings 72 when the poppet rod element is manipulated to the position illustrated in FIGS. 2 and 6.

Referring now to the forward end of the poppet rod element or actuating tip 58 that slides through reduced opening 50 and makes contact with ball 60, it is noted that in accordance with an exemplary embodiment, and as poppet rod element 52 is slid to the position illustrated in FIGS. 2 and 6, actuating tip 58 pushes ball 60 so that supply port 66 is in fluid communication with control ports 68 via openings 72, 74 and 50. As disclosed herein actuating tip 58 only pushes ball 60 so that this fluid path between port 66 and ports 68 is enabled. Thus, actuating tip only encounters forces necessary to move ball 60 (e.g., the biasing force of spring 62 and the pressure of the fluid in communication with supply port 66). There is no stopping force encountered by actuating tip 58 as the poppet rod element reaches its point of maximum movement or actuation when the flat surface of the head portion contacts the flange portion and effectively seals openings 72, wherein the ball is only biased against actuating tip 58 by the biasing force of the spring and the pressure of the supply port. Therefore, actuating tip can have relatively small cross section enabling it to pass through reduced opening 50 while still allowing fluids to pass therethrough.

It is also noted that the area of the poppet rod element that comprises the body portion to actuating tip interface does not make contact with the walls comprising opening 50 in order to maintain the fluid path between supply port 66 and control ports 68.

It is also noted that the outer configuration of the housing may be varied for insertion of the same into a fluid containing reservoir wherein O-rings 80 are received with grooves 82 in order to provide an appropriate seal between the housing and any aperture it may be inserted into. Of course, the configuration of the housing and the number of O-rings may vary.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present disclosure not be limited to the particular embodiment disclosed as the best mode contemplated for carrying out this invention, but that the invention will include all embodiments falling within the scope of the appended claims. Furthermore, no element, component, or method step in the present disclosure is intended to be dedicated to the public regardless of whether the element, component, or method step is explicitly recited in the claims.

What is claimed is:

1. A valve assembly for use with a solenoid having a plunger being actuatable from a first position to a second position, comprising:
   a housing, comprising a first port, a second port and a third port and a central opening being defined by a plurality of first channels, a plurality of second channels and a reduced opening disposed between said plurality of first channels and said plurality of second channels;
   a movable element disposed within said central opening, said movable element being moved when the plunger moves from the first position to the second position;
   wherein said first port is in fluid communication with said second port via said plurality of first channels when the plunger is in the first position; and
   wherein said first port is in fluid communication with said third port via said plurality of second channels, said reduced opening and said plurality of first channels when the plunger is in the second position.

2. The valve assembly as in claim 1, wherein said movable element comprises a head portion, a main body portion and an actuating tip, wherein said head portion seals said plurality of first channels from said second port when the plunger is in the second position and said actuating tip enables fluid communication between said plurality of first channels and said plurality of second channels.

3. The valve assembly as in claim 2, wherein said actuating tip moves a sealing member away from said reduced opening thereby enabling fluid communication between said plurality of first channels and said plurality of second channels via said reduced opening.

4. The valve assembly as in claim 3, wherein said actuating tip passes through said reduced opening.

5. The valve assembly as in claim 3, wherein said sealing member is a ball movably received with an inner race defined by said plurality of second channels, said ball being spring biased against said actuating tip in a direction opposite to the direction from the first position to the second position.

6. The valve assembly as in claim 5, wherein said ball is spring biased by a spring and a spring retaining member disposed in said third port.

7. The valve assembly as in claim 3, wherein said sealing member is ball movably received within an inner race defined by said plurality of second channels, said ball being adapted to be moved by said actuating tip.

8. The valve assembly as in claim 1, wherein said first port comprises a pair of control ports, and said second port comprises a pair of exhaust ports, and said third port is a supply port.

9. The valve assembly as in claim 1, wherein an axis of said central opening is aligned with an axis of said movable element and the axis upon which the plunger moves.

10. The valve assembly as in claim 9, wherein said movable element is not fixedly secured to the plunger.

11. The valve assembly as in claim 10, wherein said movable element comprises a head portion, a main body portion and an actuating tip, wherein said head portion seals said plurality of first channels from said second port when the plunger is in the second position and said actuating tip enables fluid communication between said plurality of first channels and said plurality of second channels.

12. The valve assembly as in claim 11, wherein said actuating tip moves a sealing member away from said reduced opening thereby enabling fluid communication between said plurality of first channels and said plurality of second channels via said reduced opening, said sealing member being spring biased in a direction opposite to the movement of the movable element when the plunger moves from the first position to the second position.

13. The valve assembly as in claim 1, wherein said first port comprises a pair of control ports orthogonally positioned with respect to said central opening and said second port comprises a pair of exhaust ports orthogonally positioned with respect to said pair of control ports, and said third port is a supply port.

14. The valve assembly as in claim 13, wherein said movable element comprises a head portion, a main body portion and an actuating tip and
fluid communication is enabled by a space defined between said head portion and a portion of said housing when the plunger is in the first position.

15. The valve assembly as in claim 14, wherein said head portion seals said plurality of first channels from said pair of exhaust ports when the plunger is in the second position and said actuating tip enables fluid communication between said plurality of first channels and said plurality of second channels.

16. The valve assembly as in claim 15, wherein an axis of said central opening is aligned with an axis of said movable element and the axis upon which the plunger moves.

17. The valve assembly as in claim 16, wherein said movable element is not fixedly secured to the plunger.

18. The valve assembly as in claim 16, wherein said head portion travels through a primary plate of the solenoid when the plunger is moved from the first position to the second position.

19. The valve assembly as in claim 1, wherein said plurality of first channels are disposed on either said housing or a portion of said movable element.

20. A three port-two way valve assembly, comprising:
   a solenoid for actuating a plunger between a first position and a second position wherein movement of said plunger from said first position to said second position manipulates an element of the valve assembly wherein movement of said element closes a first fluid path and opens a second fluid path, said first fluid path being defined by;
   a first port in the valve assembly,
   a plurality of first openings in fluid communication with said first port, said plurality of first openings defining a race for a portion of said element to move within,
   and a second port in fluid communication with said plurality of first openings when said plunger is in said first position; and
said second fluid path being defined by;
   a third port in the valve assembly,
   a plurality of second openings in fluid communication with said third port, said plurality of second openings defining a race for a sealing member movably disposed in said race, and
   an opening in fluid communication with said plurality of first openings and said plurality of second openings when said plunger is in said second position.

21. The valve assembly as in claim 20, wherein said element comprises a head portion, a main body portion and an actuating tip, wherein said head portion seals said plurality of first openings from said second port when the plunger is in the second position and said actuating tip enables fluid communication between said plurality of first openings and said plurality of second openings by moving a sealing member of said opening away from a sealing position, said sealing member being biased into said sealing position.

22. The valve assembly as in claim 21, wherein said sealing member is a ball movably received with an inner race defined by said plurality of second openings, said ball being spring biased against said actuating tip in a direction opposite to the direction from the first position to the second position.

23. The valve assembly as in claim 22, wherein an axis of said element is aligned with the axis upon which the plunger moves.

24. The valve assembly as in claim 23, wherein said element is not fixedly secured to the plunger.

25. The valve assembly as in claim 24, wherein said first port comprises a pair of control ports orthogonally positioned with respect to a central opening, said central opening being defined by said plurality of first openings, said plurality of said second openings and said opening, said central opening having an axis aligned with the axis upon which the plunger moves, and said second port comprises a pair of exhaust ports orthogonally positioned with respect to said pair of control ports, and said third port is a supply port.

26. A method for actuating a three port-two way valve assembly having a plunger being actuatable from a first position to a second position by a solenoid, comprising:
   moving the plunger from a first position to a second position wherein movement of the plunger from said first position to said second position manipulates an element of the valve assembly along the same axis as the plunger and said element closes a first fluid path defined by; a first port in the valve assembly, a plurality of first openings in fluid communication with said first port, said plurality of first openings defining a race for a portion of said element to move within and a second port in fluid communication with said plurality of first openings, and said element opens a second fluid path defined by; a third port is the valve assembly, a plurality of second openings in fluid communication with said third port, said plurality of second openings defining a race for a sealing member movably disposed in said race, and an opening in fluid communication with said plurality of first openings and said plurality of second openings;
   wherein said element comprises a head portion, a main body portion and an actuating tip, wherein said head portion seals said plurality of first openings from said second port when the plunger is in the second position and said actuating tip enables fluid communication between said plurality of first openings and said plurality of second openings by moving said sealing member of said opening away from a sealing position, said sealing member being biased into said sealing position.

27. The method as in claim 26, wherein said element is not fixedly secured to the plunger.

* * * * *